(No Model.)
T. A. WATSON.
Telephone Circuit.
No. 232,788.  Patented Sept. 28, 1880.
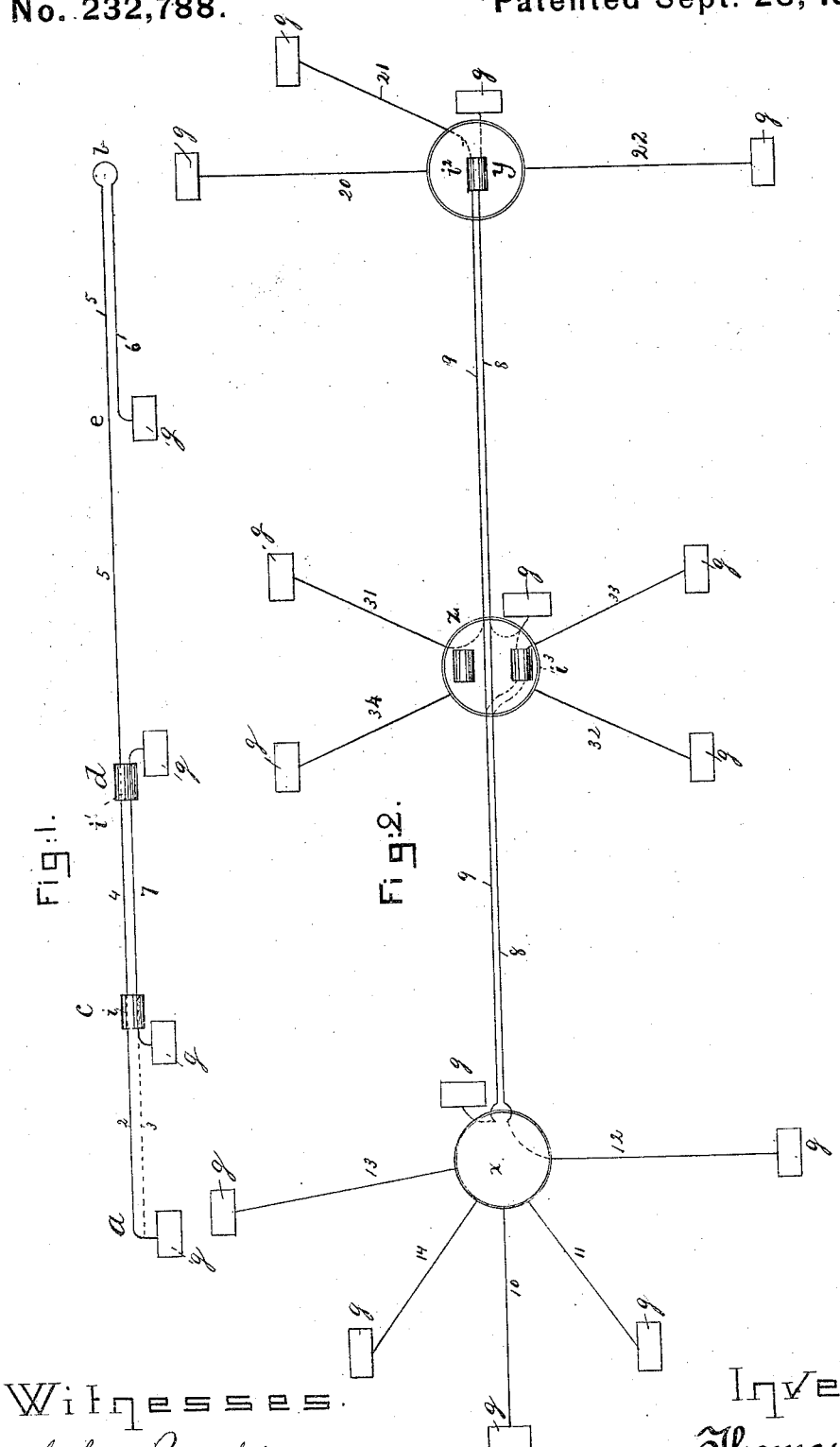
Witnesses
Arthur Reynolds.
V. D. Dearborn.
Inventor.
Thomas A Watson
by Crosby Gregory Attys

UNITED STATES PATENT OFFICE.

THOMAS A. WATSON, OF EVERETT, MASSACHUSETTS.

TELEPHONE-CIRCUIT.

SPECIFICATION forming part of Letters Patent No. 232,788, dated September 28, 1880.

Application filed July 10, 1880. (No model.)

*To all whom it may concern:*

Be it known that I, THOMAS A. WATSON, of Everett, county of Middlesex, State of Massachusetts, have invented an Improvement in Telephone-Circuits, of which the following description, in connection with the accompanying drawings, is a specification.

My invention relates to telephonic circuits, and has for its object to so arrange and connect the circuits as to avoid disturbances from induction in a more economical manner than hitherto adopted.

One method for obviating the effects of induction involves the use of a circuit entirely metallic, or having separate wires for the direct and return currents in the region of inductive disturbance, instead of using the earth for the return circuit in the usual manner. By this arrangement the currents in flowing through the portion of the said circuit having a metal return-wire, being in opposite directions in the two wires or conductors, their inductive effect on exterior circuits is neutralized, while the currents induced in the said circuit, being in the same direction in the two wires, are in opposite directions in the said circuit, considered as a whole, and neutralize one another.

In one plan founded on this method of avoiding inductive disturbances the metallic circuit is extended from one terminal of the line of communication to and through the region of inductive disturbances, where one terminal of the said circuit is grounded and the other portion connected directly with a wire extending to and grounded at the other terminal, thus avoiding the expense of two wires between the regions of inductive disturbance and one terminal of the line of communication, the circuit being completed in this part by the earth in the usual manner. This plan involves the expense of two wires from one end of the line to the region of disturbance, as well as through the said region, since if the wire intended for return currents through the region of disturbance were grounded at both ends of the said region, as just described for one end thereof, the return currents would not pass through that line of wire, but would pass directly from the grounded end of the main wire at one terminal station through the earth to the grounded end of the main wire at the other terminal station. In this case the double wire or wholly metallic portion of the circuit will not perform its function, and, as before stated, it is only when the double wire or metallic circuit is extended to one terminal of the line that the above plan operates properly. This often necessitates many miles of double wire to avoid disturbances, which occur only in a short portion thereof, as in a cable crossing a river.

When the subscribers on the different circuits of one exchange system are to be put in communication with those of another exchange system situated in a different city, or another part of the same city, the central offices of the different systems are connected by what may be termed "trunk-lines," so that any one of the circuits radiating from one central office may be connected with the end of the trunk-line in said office, and the other end of said trunk-line may be connected with the desired one of the circuits radiating from another office, and the subscribers on the said two circuits thus be put in communication, as desired. Where several such trunk-lines are placed between the same offices, or when a trunk-line runs parallel with lines used for telegraphic purposes, being, for example, supported on the same poles, or included in the same cable, these trunk-lines are in the region of disturbance; and if double wire or metallic circuit trunk-lines are used, it would be necessary for the proper operation on the plan above described that all the subscribers' circuits at all but one of the offices connected with the said trunk-lines should be properly arranged to afford a metallic circuit between the terminal of the two wires of the trunk-line to be connected with said metallic circuit; for if they were not, one of the wires of the trunk-line would be cut out, as above described, and the said line would not properly perform its function.

Figure 1 is a diagram of the circuit for a single continuous line of communication illustrating my invention, and Fig. 2 is a diagram of three exchange systems and their central offices connected by a trunk-line and provided with means to place them in communication in accordance with my invention.

The line of communication between *a* and *b*,

Fig. 1, is represented as exposed to inductive disturbances between the points c and d, and also between b and e, and to avoid the effects of such disturbance the circuit is wholly metallic, consisting of two wires between these points. In the plans previously adopted it would be necessary that the circuit between a and c should also be metallic, as shown by the dotted line, or else that it should be metallic all the way from b to c, in either case passing over space not exposed to disturbance, although by grounding the terminals of one of the wires of the metallic circuit, as shown at d and e, a single wire is sufficient between those points.

Supposing it were attempted to omit the second wire, 3, between a and c, and the wire 2 were connected with the earth-plate g at a, and then connected with the end of one of the wires, as 4, between c and d, the said wire 4 being connected at d with the wire 5, passing to b, and there connected with the return-wire 6, extending from b to e and grounded at e, the electric currents and impulses would pass from a over wires 2, 4, 5, and 6, through b to the ground g at e, and thence to the ground at a, and it would not pass over the return-wire 7 between c and d even if it were grounded at c as well as at d, so that this portion of the line would still be subject to disturbance. If, however, an induction-coil, i, having its helices properly proportioned relatively to the circuits of which they are to form a part, be placed at c, and the circuit-wire 2 be grounded at a and c, after passing through one of its helices, and the closed metallic circuit 4 7 pass through the other, then every impulse passing through the circuit a 2 c will induce in the circuit 4 7 an impulse which will be felt at d. If, now, I place another induction-coil, as i', at d, include one of its helices in the closed circuit 4 7, and the other in the earth-circuit d 5 b 6 grounded at e, then every impulse or variation felt in the earth-circuit a 2 c will induce corresponding currents in the metallic circuit 4 7, which will, in turn, induce in the earth-circuit d 5 b 6 e impulses which will be felt at b, and I shall be put to the expense of a metallic circuit only where needed.

It is obvious that the second induction-coil, i', will not be necessary, as both metallic portions c d and e b of the circuit may be included in a single grounded circuit; but when there are more than two regions of disturbance, or if there are two and neither of them is adjacent to the end of the line, the induction-coils will have to be properly arranged to separate the grounded circuits from each other, as will be readily understood. This arrangement may be used where a number of lines are to pass through one cable in a part of their course and diverge at each end thereof, and it is also obvious that a very valuable application of this system will be to connect, by double wire or metallic circuit trunk-lines, two telephone-exchange offices, and at the same time allow these trunk-lines to be used by subscribers to each exchange whose instruments are connected with it by grounded circuits. Fig. 2 shows such an arrangement, and also shows a method by which a third office or set of lines can be connected with the system at an intermediate point in the metallic circuit.

The central offices $x\,y\,z$, each containing the terminals of several of the usual grounded subscribers' circuits 10 11 20 21 30, &c., are connected together by one or more trunk-lines, each consisting of two wires, 8 9, both included in the circuit, it being supposed that there are other circuits which would disturb, by their inductive effect, the said trunk-line if single lines were used with the ground as the return circuit in the usual manner.

When it is desired to place a subscriber on one of the circuits, as 12, centering in office $x$, with a subscriber on one of the circuits, as 21, centering at $y$, the end of the said circuit 12 at the office $z$ may be directly connected to one of the wires, as 8, of the trunk-line, the other wire, 9, of said trunk-line being connected to the ground $g$ at station $x$, as indicated by the dotted lines. If the ends of the wires 8 9 are connected at office $y$, a complete circuit will be formed through the said circuit 12 and the wire 8, and back through the wire 9, and thence by the ground between the office $x$ and the subscriber's station in question on circuit 12. By placing instruments in the said circuit at office $y$ communication would be established between said office and the subscriber's station, and the effects of induction over the portion of the line between offices $z$ and $y$ exposed to such effects would be neutralized, as before described.

If the subscriber's circuit 21 were connected with the wire 8 of the trunk-line, it will be seen that the wire 9 will be cut out of the circuit, whether it be grounded or not, at office $y$, the said circuit now passing from the subscriber's station on circuit 12 over said circuit and wire 8 and circuit 21 to the subscriber's station, returning directly by the ground, and thus throwing out the wire 9 and rendering the circuit liable to cause or receive disturbances from induction.

To establish communication in accordance with my invention and include both the wires 8 9 in the circuit, I connect them at office $y$ with the electrodes of one helix of the induction-coil $i^2$, the other helix whereof is connected at one end with the circuit 21 and at the other end with the ground. When connected in this manner the electric impulses in the circuit 12 and trunk-line and helix of the coil $i^2$ in circuit therewith induce similar impulses in the other helix of the induction-coil $i^2$ and the grounded circut 21, in connection therewith, and similarly the currents are transmitted from circuit 21 by induction to the trunk-line 8 9 and connected circuit 12. If desired, induction-coils $i^2$ might be placed at both ends $x\,y$ of the trunk-line 8 9, and the electric impulses transmitted by induction from one circuit to the other in series.

When other offices are situated at intermediate points, as shown at $y$, the trunk-line may be parted, when desired, to connect a subscriber's circuit at such intermediate station, and an induction-coil, $i^2$, interposed between the said circuit, as the one 33, and the end of that part of the trunk-line lying between the offices to be connected, and joined at its other end, as at $x$, to the desired circuit, as 12, and the ground, as before described. The other portion of the trunk-line lying between $z$ and $y$ may be used at the same time to connect subscriber's circuits, as shown.

By the herein-described arrangement and method of operation electric impulses may be transmitted by induction from one to another of a series of different circuits placed end to end to form a continuous line of communication, and containing double-wire or metallic circuits at the parts exposed to disturbance from induction and grounded circuits and at all other parts for a distance nearly as great as it can be transmitted directly in a single continuous circuit, and the subscribers in a series of grounded circuits centering in one office may be connected with those at another office by trunk-lines running parallel to one another, or to lines used for telegraphic purposes, without danger of disturbance from foreign induced currents.

I claim—

1. The herein-described arrangement of metallic and grounded circuits, constituting a continuous line of communication, containing metallic return-wires in the portions exposed to disturbance from neighboring wires, and grounded wires with an earth return in parts not exposed to such disturbance, substantially as described.

2. In a telephone-exchange system, grounded subscribers' circuits centering in different offices, and trunk-lines connecting the said offices, consisting of direct and return wires, forming a complete metallic circuit, to obviate the effects of induction in the said trunk-lines, combined with induction-coils at one or both extremities of the trunk-lines, to enable subscribers on the grounded circuits centering in different offices to communicate with one another through the said trunk-line, substantially as described.

In testimony whereof I have signed my name to this specification in the presence of two subscribing witnesses.

THOMAS A. WATSON.

Witnesses:
JOS. P. LIVERMORE,
N. E. C. WHITNEY.